Jan. 20, 1959  A. KRÖTZ  2,869,601
MEAT MINCING MACHINE
Filed March 29, 1954  5 Sheets-Sheet 1

INVENTOR·
Albert Krötz
By Bryant & Lowry
Attys.

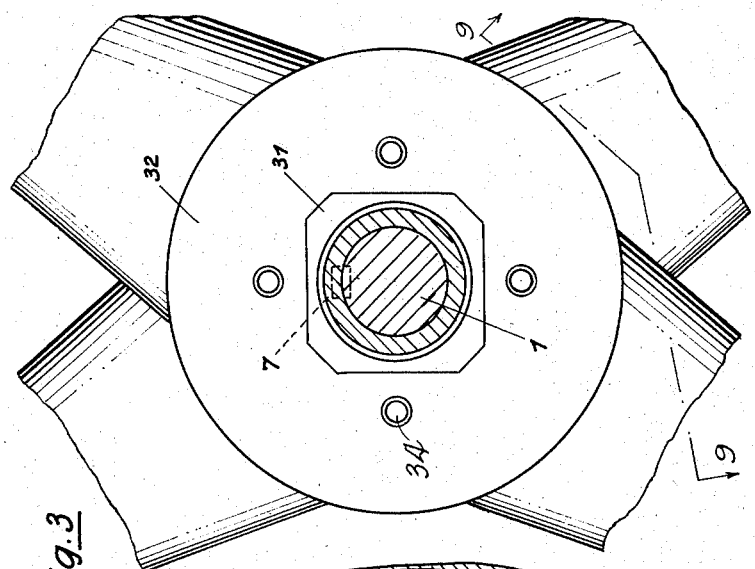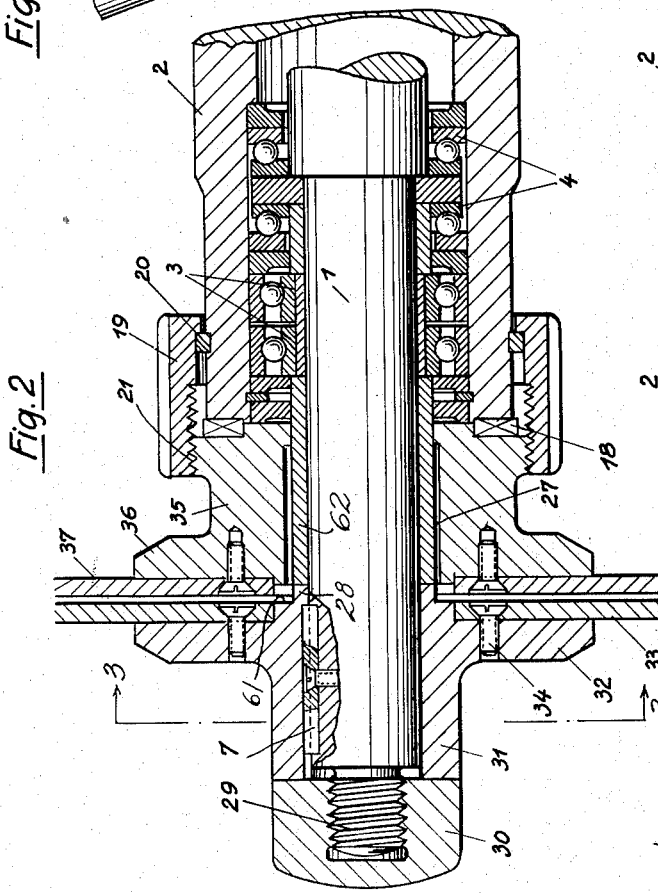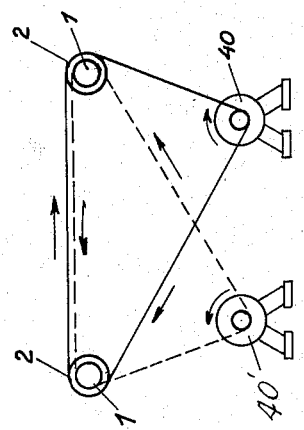

Jan. 20, 1959   A. KRÖTZ   2,869,601
MEAT MINCING MACHINE
Filed March 29, 1954   5 Sheets-Sheet 3
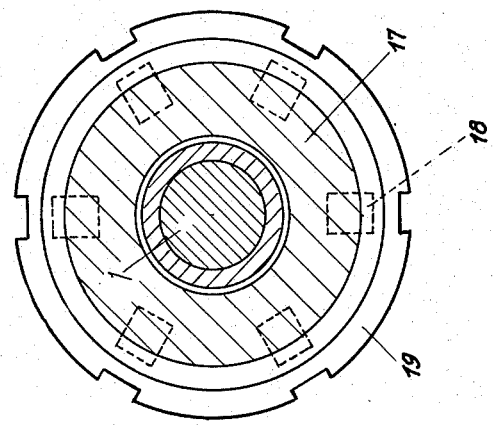
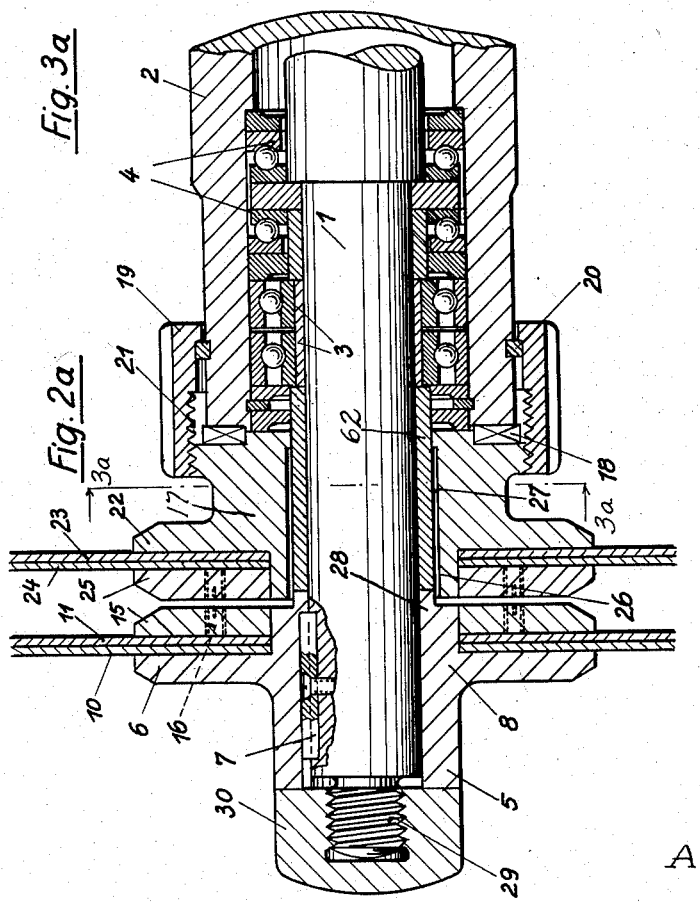
INVENTOR:
Albert Krötz
By Bryant & Lowry
ATTYS.

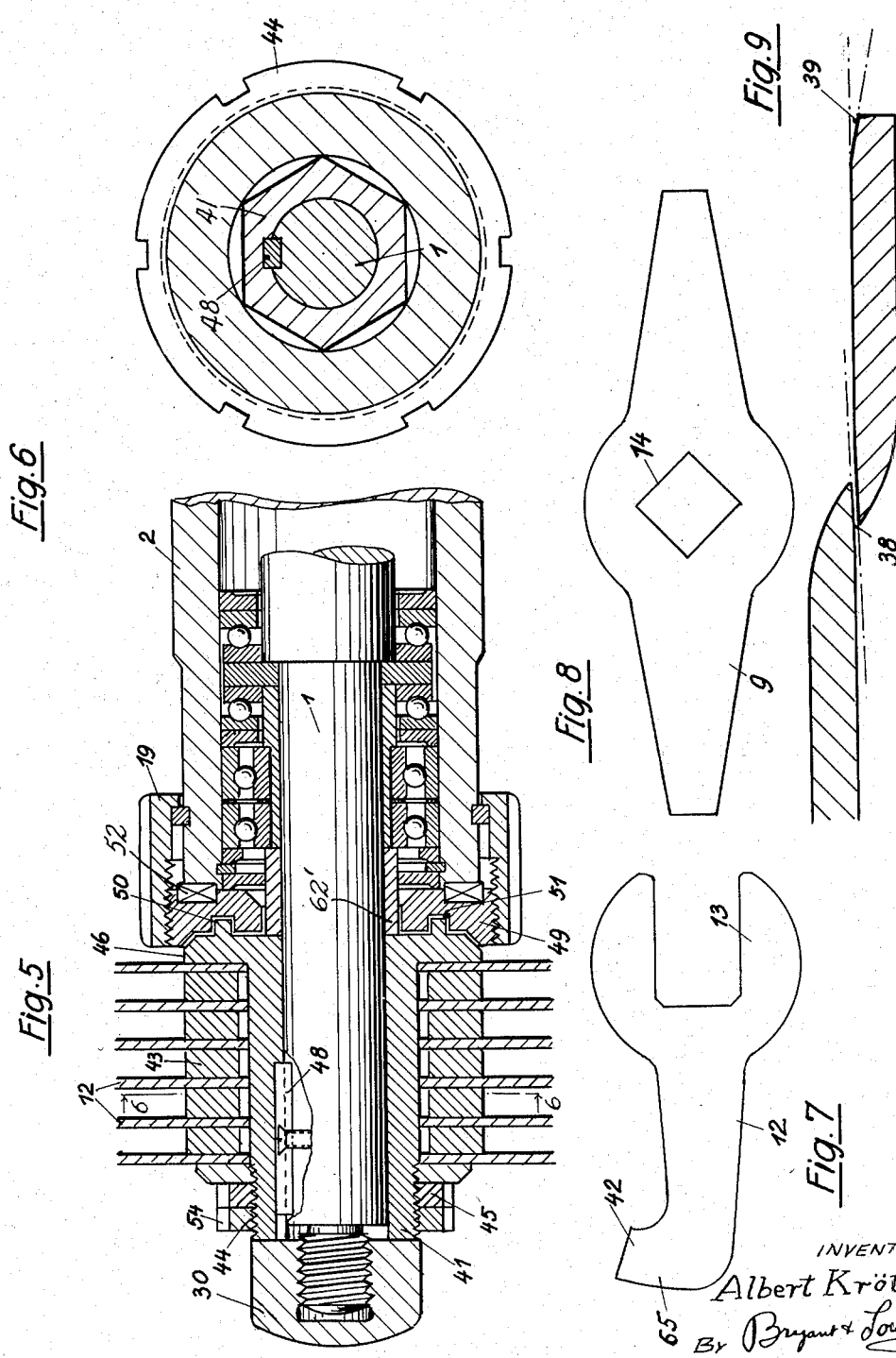

Jan. 20, 1959  A. KRÖTZ  2,869,601
MEAT MINCING MACHINE
Filed March 29, 1954  5 Sheets-Sheet 5
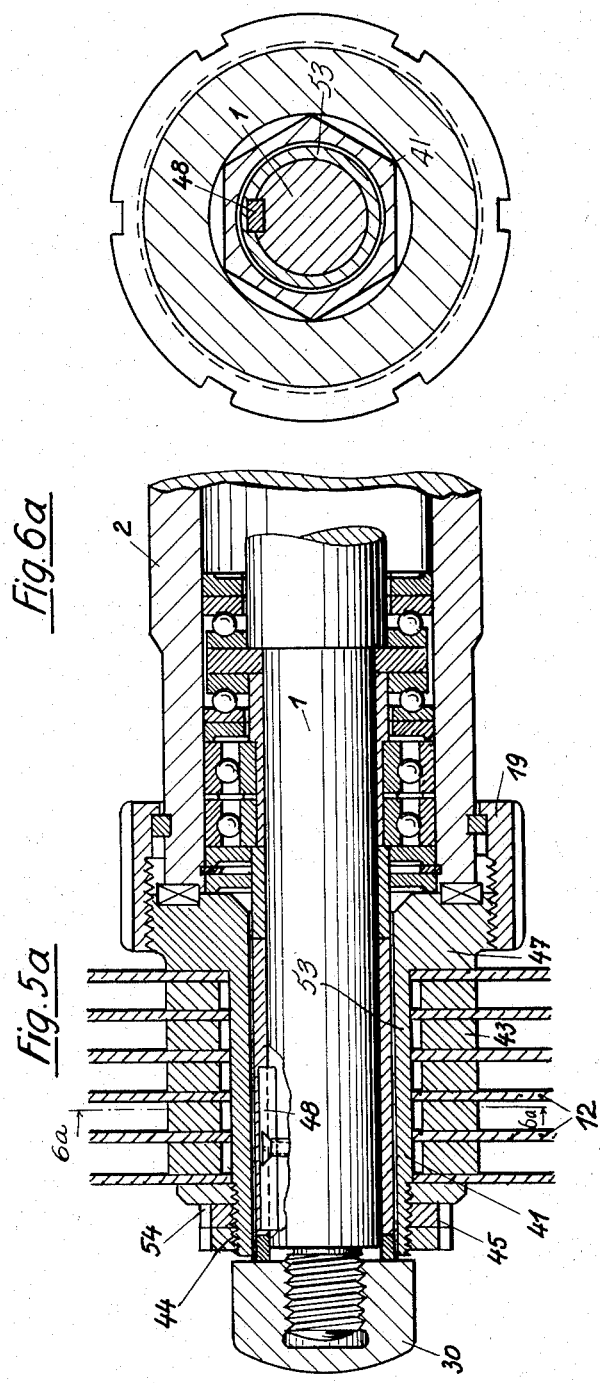
INVENTOR:
Albert Krötz
By Bryant & Lowry
ATTYS.

United States Patent Office

2,869,601
Patented Jan. 20, 1959

2,869,601

MEAT MINCING MACHINE

Albert Krötz, Stuttgart, Germany

Application March 29, 1954, Serial No. 419,528

Claims priority, application Germany March 28, 1953

3 Claims. (Cl. 146—67)

This invention relates to meat mincing machines, and more particularly to a meat chopping or mincing machine for producing the filling for sausages.

Meat chopping or mincing machines are known in which the meat carried in an annular meat trough is worked by a cutting aggregate which, according to the kind of filling to be produced, comprises a shaft mounted at one or both ends and carrying one or several knives, or a shaft mounted at both ends on which a second hollow shaft is mounted and journalled at one end, and two adjacent knives, one carried by each of said shafts rotate in opposite directions.

The main feature of the meat chopping or mincing machine according to the present invention is that it comprises two or more knife carrying shafts on which they are mounted at one end like propellers.

These knife shafts may be so arranged that the knives on the shafts are distributed over a length of the end of each shaft, for example in the case of two knife assemblies at two diametrically opposite points of the meat trough, so that there are a corresponding number of cutting assemblies each consisting of a knife shaft carrying one or several knives. Such an arrangement not only produces a correspondingly greater output as compared with a single assembly of this type, but also turns out a much better product. Firstly, the number of knives which can be used in a single assembly is limited by the horizontal curvature of the meat trough. Secondly, when the meat trough rotates at the most favorable speed, the time for each rotation in the case of a single cutting point is too long, that is the work is carried out too slowly. Increasing the speed of rotation certainly improves the output, but the meat becomes very warm, which has a detrimental effect on its quality. The arrangement of several cutting points enables the time of rotation to be utilized to better advantage and allows the knives to be run at such a speed that the meat is not overheated and can cool down sufficiently between one cutting point and the next, so as to ensure a filling of good quality.

Another, particularly advantageous form of construction consists in the arrangement of two or more knife shafts one within the other and mounted in a common bearing.

The drive of the knife shafts is preferably such that they are driven jointly in opposite directions and at the same speed or at different speeds. In practice this can easily be arranged by variable-speed motors, using reversing gears or reversible motors, suitable switches, separate motors for the individual shafts or groups of shafts, and so forth, whereby all or at least some of the shafts rotating in the same direction preferably have a common drive.

An advantageous form of construction of a meat mincing machine according to the invention is attained when two or several independently operating cutting assemblies are arranged in spaced relation in the meat trough and incorporate an equal or unequal number of knife shafts, whereby knife shafts arranged one within the other are arranged in at least one of the assemblies. With such a machine it is possible to provide a great number of different kinds of drive, which enables the cutting to be very accurately suited to the requirements of the filling to be produced.

To make it more easy for the operator to choose the most advantageous number and arrangement of knives for the desired purpose or for the particular kind of business, and also to enable unskilled operators to make the proper choice, different kinds of cutter heads are, according to the invention, provided as complete units for selectively fitting on the knife shafts, these units being provided with knives adapted as regards their number and arrangement for the purposes for which they are actually required. In particular, the cutter heads for synchronous running are used with a single shaft, that is the inner shaft and/or an outer shaft, and counter-running cutter heads for obtaining a shearing cut with greater knife spacing (about 30 mms.) for certain kinds of sausages and knives spaced at about 2 mms. for cutting skins, sinews and the like in raw state.

At the same time it is advisable, in the case of relatively wide spacing of the cooperating knives, to use thin knives in order to reduce the friction and the heating of the meat resulting therefrom, whereas close spacing requires thicker knives on account of the danger of vibration of the thinner knives resulting in breakdowns due to the knives swinging out of their path of movement, getting locked and breaking off, and so forth.

In spite of the many possibilities of use with a drive which is simple to operate, provision is also made according to the invention, for fitting in the case of synchronous drive, a cutter head of suitable construction possibly only on that particular counter running knife shaft which rotates in the desired direction.

A preferred embodiment of the invention is illustrated by way of example in the accompanying drawings, in which:

Fig. 1 is a vertical sectional view as observed in the plane of line 1—1 on Fig. 1a;

Fig. 2 is a vertical longitudinal sectional view showing cutter heads adapted for opposite direction rotation and which are provided with closely spaced counter rotatable knives;

Fig. 2a is a vertical longitudinal section of a modified embodiment wherein the cutter head is provided with more distantly spaced counter rotatable knives;

Fig. 3 is a transverse sectional view taken on line 3—3 of Fig. 2;

Fig. 3a is a view corresponding to Fig. 3, taken on line 3a—3a of Fig. 2a;

Fig. 4 is a diagram showing a method of driving a machine such as shown in Figs. 1 and 2 by means of two motors;

Fig. 5 shows in vertical section a synchronous running cutter on the inner shaft;

Fig. 5a is a vertical longitudinal sectional view showing a synchronous running cutter head on the outer shaft;

Fig. 6 is a transverse sectional view taken on line 6—6 of Fig. 5;

Fig. 6a is a transverse sectional view taken on line 6a—6a of Fig. 5a;

Figs. 7 and 8 show different shapes of knives in plan view; and

Fig. 9 shows the special shape of blades in cross section taken on line 9—9 of Fig. 3.

Figure 1:
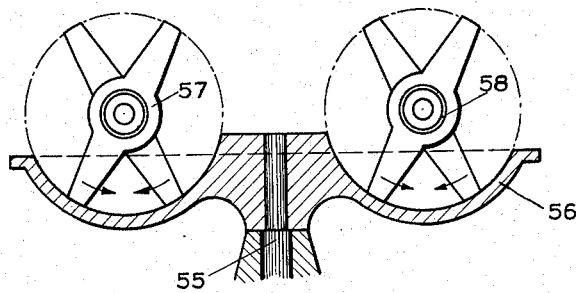
Figure 1A:
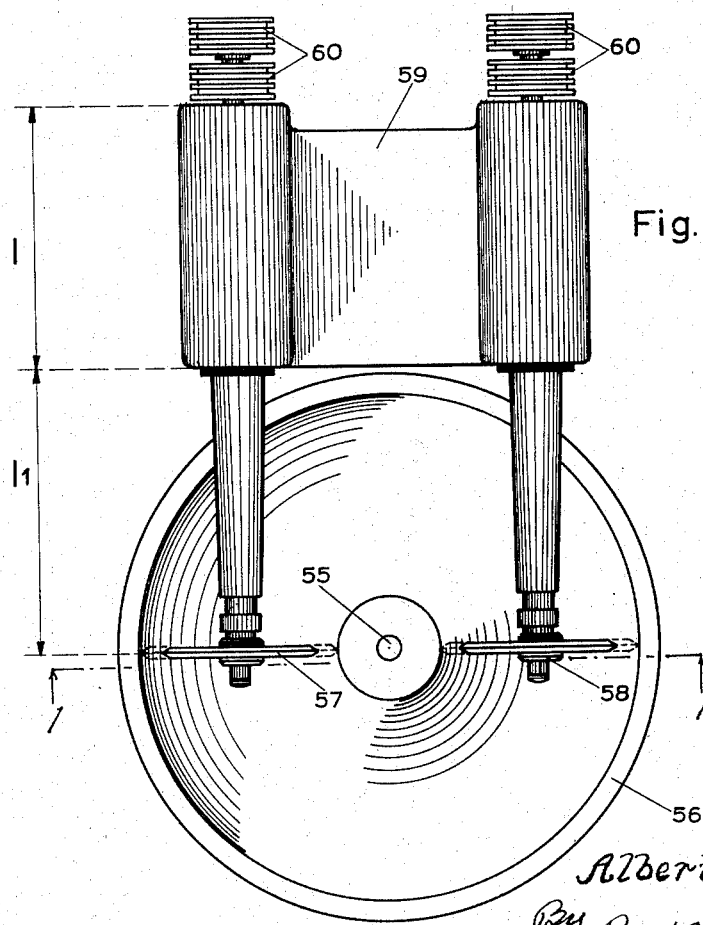
Fig. 1a is a top plan view of the machine shown in Fig. 1.

In the form of construction illustrated, the meat mincing machine consists substantially, according to Figs. 1 and 1a, of a stand 55 carrying an annular meat trough 56 in which two separate cutting aggregates 57, 58 operate. These aggregates are situated diametrically opposite in respect to the meat trough, whereas their respective knife shafts 1, 2 extend parallel to each other and the knives are mounted at the ends of their respective shafts like propellers and the shafts are driven at their other ends which are extended to the same side of the machine. A suitable bearing and drive are indicated diagrammatically in Fig. 1a at 59 and 60 respectively.

Each of the cutting assemblies of the meat mincing machine has an inner shaft 1 enclosed in a hollow outer shaft 2.

The outer shaft 2 is slightly shorter than the inner shaft 1 and supported at its free end by means of radial and thrust bearings 3 and 4, respectively, also by the inner shaft 1 in order to ensure accurate concentric running.

The two shafts 1, 2 are in this construction driven in opposite directions by one or preferably two motors 40 and 40′, as shown in Fig. 4.

Fig. 2 shows a cutting assembly in which both shafts 1 and 2 carry knives which rotate in opposite directions and cooperate like shears. For various purposes, for example for producing fillings for sausages, such counter-rotation is advisable and spacing the knives axially at 10 to 30 mms. apart has been found particularly advantageous.

In order to avoid the necessity of repeatedly adjusting the knives in each particular case in the manner described in the introduction, the knives are arranged in a cutter head ready for use; this cutter head is illustrated in Fig. 2a for the kind of cutting mentioned. Each cutter head consists substantially of a sleeve part and a supporting flange. In the present instance a sleeve 5 provided with a flange 6 is fixed on the inner shaft 1 by means of an axial key 7. The flange 6 is situated at some distance from the end of the sleeve directed towards the outer shaft 2, so that a collar 8 is formed on which a knife 9 with several, preferably two blades is arranged, as shown in Fig. 8, or several single bladed, mutually displaced knives 10, 11 are mounted, as shown in Fig. 2a. The collar 8 is, for this purpose, preferably of square or hexagonal cross section and the knife has a correspondingly shaped hub as can be seen from the constructions shown in Figs. 7 and 8, for example. In the case of Fig. 7 the knife has a special arm 12 which terminates in an open fork-shaped hub 13, while in Fig. 8 a double-bladed knife with a square hole 14 is shown.

The knife or blades 10, 11 shown in Fig. 2a is or are clamped against the flange 6 by a clamping ring 15 screwed or pressed on to the collar 8. A grub screw 16 is provided in one or several bores in the clamping ring 15 for fixing and forcing off the clamping ring 15.

The corresponding cutter head for the outer shaft 2 is constructed in substantially similar manner. Its hub 17, however, fits loosely on the inner shaft 1 and is coupled for rotation with the end face of the outer shaft 2 by means of castellations 18 on one part and corresponding grooves in the other part or by coupling keys or the like which cooperate with corresponding grooves in both parts, and is secured in axial direction by means of a retaining nut 19 having an inner flange which engages behind a collar ring 20 on the outer shaft 2 and is screwed on to an external thread 21 on the hub 17. Knife arms or blades 23, 24 are clamped against the supporting flange 22 of the cutter head by means of a ring 25. A collar 26 formed by the hub 17 has a concentric recess or groove 27 in which the hub 5 of the inner cutter head 5, 6 is guided by means of a corresponding flange 28 on the collar 8. At its other end the inner cutter head 5, 6 is secured in axial direction by a cap nut 30 screwed on to a threaded journal 29 on the end of the knife shaft 1, with interposed washers, packings or the like.

The two cutter heads can be pulled off after the two screws 19 and 30 have been unscrewed.

For cutting sinews, skins and the like the narrowest possible spacing the cooperating knives, somewhere in the range between 0 and 2 mms., is necessary and the cutter heads therefor are constructed as shown in Fig. 2. The cutter head for the inner shaft consists of a sleeve 31 and a supporting flange 32, which in this case is situated so close to the end of the sleeve that the knife 33, which in this cutter head is in one piece like the knife 9 shown in Fig. 8 and has two or more blades or arms and is fixed on the supporting flange 32, for example, by means of countersunk screws 34, is flush with the end face 61 of the sleeve 31 directed towards the outer shaft. Once again only a narrow annular flange 28 (Fig. 2a) acts as a guide and for supporting the cutter head in the corresponding groove 27 or on a sleeve 62 which is arranged within the sleeve and the bore of the cutter head of the outer shaft.

The cutter head of the outer shaft consists of a sleeve 35 with a flange 36 at one end, on which a knife 37 is fixed by screws, and provided at its other end with castellations 18 or the like, and with the external screw thread 21 on which the retaining nut 19 is threaded. An internal flange on the other end of the nut 19 engages the collar ring 20 which is anchored to the outer shaft 2.

It is also pointed out in connection with both these cutter heads for cutting sinews that, in view of the close spacing of the cooperating knives 33, 37 vibrations in these knives must be avoided, so that, contrary to the first described cutter heads illustraed in Fig. 2a having thin blades which keep down friction and consequently the heating of the meat as much as possible, a rigid knife construction, having much stiffer knives, is used as indicated in the drawings. At the same time the thickness of the knives in heads for cutting sinews is not even throughout its entire cross-section of the blade, but is so shaped that its outer surface is tapered toward the cutting plane at knife edge 38 and the inner surface is relieved at the back 39 as shown in Fig. 9.

Replacement cutter heads intended for synchronous drive in the same direction differ from those intended for counter running drive which have just been described, in that more knife blades or arms are preferably used, three blades or arms being advantageous, and when using single armed knives these are arranged one behind the other spaced in axial direction and mutually displaced through uniform angular spacing around the axis of the shaft as shown in Fig. 6.

Such a form of construction is illustrated in Figs. 5 and 5a, wherein it is supposed that Fig. 5 shows such a cutter head for synchronous drive only with the inner shaft 1, and Fig. 5a, only with the outer shaft 2.

As mentioned at the outset, when employing counter-running knife shafts with synchronous drive in each cutting assembly only one shaft is used, i. e. only the one provided with knives.

It is desirable that the knives work always from the side of the trough adjacent the axis of rotation in downward direction and towards the outer edge of the trough, that is from the inside towards the outside, and therefore in the case of two diametrically arranged assemblies they will work in opposite directions the one relatively to the other. In the case of a driving arrangement such as that shown in Fig. 4, in which the drive is derived from two counter-running motors 40 and 40′, one driving the inner shaft 1 and the other the outer shaft 2 of the two assemblies, this is attained by fitting a synchronous running cutter head on the inner shaft in one of the assemblies and on the outer shaft in the other assembly.

Both the cutter heads consist substantially of a sleeve 41 slipped onto the inner shaft 1. On the end of the sleeve 41 directed towards the outer shaft a flange 46 or 47 is provided. On the sleeve 41, which is for example of hexagonal shape, as shown in Fig. 6, six knife arms 12, as shown in Fig. 7, are mounted which have a forked, suitably shaped hub part 13 and preferably a lug-shaped extension 42 with peripheral cutting edge 65 on the back of the knife in the zone of the free cutting end.

The six arms 12 are mutually displaced through an angle of 60° and separated from each other by spacer rings 43. On the free end of the sleeve 41 an external screw thread 44 is provided on which a nut 45 secured by a lock nut can be screwed for clamping the knife arms 12 and the spacer rings 43 against flanges 46 or 47, respectively, of the sleeve 41.

The cutter heads 41, 46 for the inner shaft 1 has in the bore of the sleeve a groove by means of which it is slipped onto axial keys 48 on the inner shaft 1 and is held thereon independently against rotation. The sleeve 41 is pressed against spacer sleeve 62' into close proximity to a guide ring 49 by means of the cap nut 30 of the inner shaft 1 and has on its end face an annular rib 50 engaging in the annular groove 51 of the guide ring 49. This guide ring 49 is located in front of the end face of the outer shaft 2 and coupled therewith by castellations or coupling keys 52 and grooves or the like and secured in position by the previously described retaining nut 19 which is screwed onto its external thread.

The replacement cutter head for attachment to the outer shaft 2, as shown in Figs. 5a and 6a, differs in that it fits loosely on the inner shaft 1, a guide and spacer sleeve 53 with a wall thickness slightly greater than the projecting height of the keys 48 being preferably provided on the inner shaft within the bore of the sleeve 41.

The end flange 47 of the sleeve is directly coupled on its end face with the end face of the outer shaft 2 by means of castellations or coupling keys 48 or the like and provided with an external screw thread for receiving the retaining nut 19.

The retaining nut 19 in all the forms of construction and also the clamping nut 45 and its lock nut and so forth may be provided with peripheral recesses 54 for the engagement of a hook spanner or may be constructed as a hexagonal nut.

From the above detailed description of the invention, it is believed that the construction will at once be apparent, and while there is herein shown and described the preferred embodiment of the invention, it is nevertheless to be understood that minor changes may be made therein without departing from the spirit and scope of the invention as claimed.

For instance:

It is possible to still further increase the versatility of service of the machine according to the invention by driving the meat trough independently of the cutting aggregates by means of a separate and preferably variable-speed motor, which is not the case in the known meat mincing machines. This enables the trough to be stopped while the knives are rotating or, depending upon the kind of work being carried out, to be rotated at different speeds while the knives are rotating at a uniform speed, or finally the trough can rotate by itself while the knives are stationary.

It is also pointed out that the invention, as already mentioned, is not restricted to the fitting of two cutting assemblies, as has been described above, but in order to increase the output three or more cutting assemblies of any similar construction and arrangement can be arranged in a common meat trough spaced at less than 180° therein.

In the same way as it is possible in the forms of construction herein described with two assemblies to allow each of the two assemblies to run at a different speed in the case of synchronous drive, or to drive one assembly in one direction and the other in counter-direction, and so forth, it is evident that the possibilities of combination will be very considerably greater when three or more assemblies are used.

Furthermore, the drive may also be so arranged that parts of the one or the other assembly can be stopped independently of the other parts or all shafts of one assembly or of the individual assemblies can be switched on to synchronous running.

An important point in connection with the propeller-like mounting according to the invention and the high speeds of rotation which are generally used today, is the novel feature that the bearing length 1 of the knife shafts is made approximately the same as the free length $l_1$ of the shafts, with the result that vibrations are avoided.

I claim:

1. A machine of the type described comprising a cutter assembly adapted to be used in combination with a rotary meat trough, said assembly comprising a shaft and a sleeve rotatably carried thereabout, said shaft and sleeve being rotatably mounted adjacent one end only thereof in a bearing member, drive means associated with said shaft and sleeve for causing relative rotation thereof, the end of said shaft opposite said bearing member extending beyond said sleeve, cutter supporting means on the above end of said shaft and on the adjacent end of said sleeve, said supporting means being spaced from each other, and cutters carried by at least one of said cutter supporting means.

2. A machine of the type set forth in claim 1, wherein the cutters are carried by the supporting means on the shaft.

3. A machine of the type set forth in claim 1, wherein the cutters are carried by the supporting means on the sleeve.

References Cited in the file of this patent

UNITED STATES PATENTS

| | | |
|---|---|---|
| 165,442 | Goddard | July 13, 1875 |
| 545,180 | Steigert | Aug. 27, 1895 |
| 588,828 | Hinrichs | Aug. 24, 1897 |
| 2,245,012 | Robinson | June 10, 1941 |
| 2,476,867 | Hohman | July 19, 1949 |
| 2,635,663 | Schmidt | Apr. 21, 1953 |

FOREIGN PATENTS

| | | |
|---|---|---|
| 56,590 | Switzerland | May 31, 1911 |
| 81,443 | Switzerland | Nov. 1, 1919 |
| 814,402 | Germany | Sept. 20, 1951 |
| 139,841 | Sweden | Jan. 15, 1953 |